(12) United States Patent
Luo et al.

(10) Patent No.: US 11,662,519 B2
(45) Date of Patent: May 30, 2023

(54) OPTICAL WAVEGUIDE TUNING ELEMENT

(71) Applicant: ADVANCED MICRO FOUNDRY PTE. LTD., Singapore (SG)

(72) Inventors: Xianshu Luo, Singapore (SG); Guo-Qiang Lo, Singapore (SG)

(73) Assignee: ADVANCED MICRO FOUNDRY PTE. LTD., Singapore (SG)

( * ) Notice: Subject to any disclaimer, the term of this patent is extended or adjusted under 35 U.S.C. 154(b) by 0 days.

(21) Appl. No.: 17/286,004

(22) PCT Filed: Oct. 18, 2019

(86) PCT No.: PCT/SG2019/050519
§ 371 (c)(1),
(2) Date: Apr. 16, 2021

(87) PCT Pub. No.: WO2020/081014
PCT Pub. Date: Apr. 23, 2020

(65) Prior Publication Data
US 2021/0356664 A1 Nov. 18, 2021

(30) Foreign Application Priority Data

Oct. 19, 2018 (SG) .......................... 10201809247Q

(51) Int. Cl.
*G02B 6/12* (2006.01)
*G02F 1/01* (2006.01)
(Continued)

(52) U.S. Cl.
CPC ....... *G02B 6/12007* (2013.01); *G02F 1/0147* (2013.01); *G02F 1/025* (2013.01);
(Continued)

(58) Field of Classification Search
CPC ............ G02B 6/12004; G02B 6/12007; G02B 6/29301; G02B 6/29395; G02F 1/0147; G02F 1/025
See application file for complete search history.

(56) References Cited

U.S. PATENT DOCUMENTS

| 6,084,050 A * | 7/2000 | Ooba ...................... G02F 1/065 398/1 |
| 6,849,914 B2 | 2/2005 | Day |

(Continued)

FOREIGN PATENT DOCUMENTS

| JP | 2007047326 A * | 2/2007 |
| JP | 2007047326 A | 2/2007 |

OTHER PUBLICATIONS

International Preliminary Report on Patentability for corresponding application PCT/SG2019/050519 filed Oct. 18, 2019; dated Feb. 11, 2021.

(Continued)

*Primary Examiner* — Ryan A Lepisto
(74) *Attorney, Agent, or Firm* — Bookoff McAndrews, PLLC

(57) ABSTRACT

A tunable element for an optical waveguide device, such as an Optical Phased Array (OPA), is described. Tunable element comprises three waveguide sections arranged such that light propagates through the first waveguide section, then through the second waveguide section and then through the third waveguide section, with light being either evanescently or directly coupled from one waveguide section to the next. The tunable element further comprises one or more resistive heating pad formed proximate to the second waveguide section. The first and third waveguide sections are formed from a first material and the second waveguide section is formed from a second, different material and the second (Continued)

material is more thermo-optically sensitive than the first material.

19 Claims, 12 Drawing Sheets

(51) Int. Cl.
  *G02F 1/025* (2006.01)
  *G02B 6/293* (2006.01)
(52) U.S. Cl.
  CPC ...... *G02B 6/12004* (2013.01); *G02B 6/29301* (2013.01); *G02B 6/29395* (2013.01)

(56) References Cited

U.S. PATENT DOCUMENTS

| | | | |
|---|---|---|---|
| 6,920,159 B2 * | 7/2005 | Sidorin | H01S 5/141 |
| | | | 372/102 |
| 7,305,160 B2 * | 12/2007 | Park | G02B 6/12007 |
| | | | 385/24 |
| 7,582,233 B2 * | 9/2009 | Koyama | G02B 6/125 |
| | | | 264/1.25 |
| 8,320,763 B2 * | 11/2012 | Kim | H01S 5/0612 |
| | | | 398/68 |
| 9,684,191 B2 * | 6/2017 | Gill | G02F 1/025 |
| 10,788,368 B1 * | 9/2020 | Pelc | G01J 3/0286 |
| 2003/0138209 A1 * | 7/2003 | Chan | G02B 6/12007 |
| | | | 385/37 |
| 2010/0232458 A1 * | 9/2010 | Kim | G02B 6/4215 |
| | | | 372/20 |
| 2016/0334648 A1 * | 11/2016 | Lu | G02F 1/2257 |
| 2018/0217472 A1 | 8/2018 | Poulton | |

OTHER PUBLICATIONS

International Search Report for corresponding application PCT/SG2019/050519 filed Oct. 18, 2019; dated Feb. 11, 2021.
Written Opinion for corresponding application PCT/SG2019/050519 filed Oct. 18, 2019; dated Feb. 11, 2021.
Richard Jones, "Integration of SiON gratings with SOI", Group IV Photonics, Sep. 21, 2005, pp. 192-194, XP010841418.
Wesley D. Sacher,"Multilayer Silicon Nitride-on-Silicon Integrated Photonic Platforms and Devices", Journal of Lightwave Technology, vol. 33, No. 4, Feb. 15, 2015.
Yubing Wang, "Improved performance of optical phased arrays assisted by transparent graphene nanoheaters and air trenches", The Royal Society of Chemistry 2018, RSC Adv., 2018, 8, 8442-8449.

* cited by examiner

[Fig. 1A]
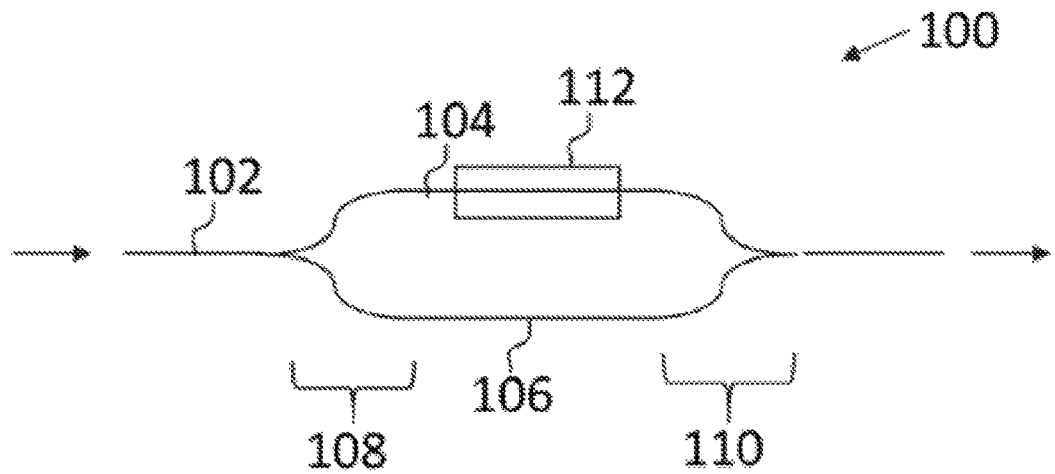
[Fig. 1B]
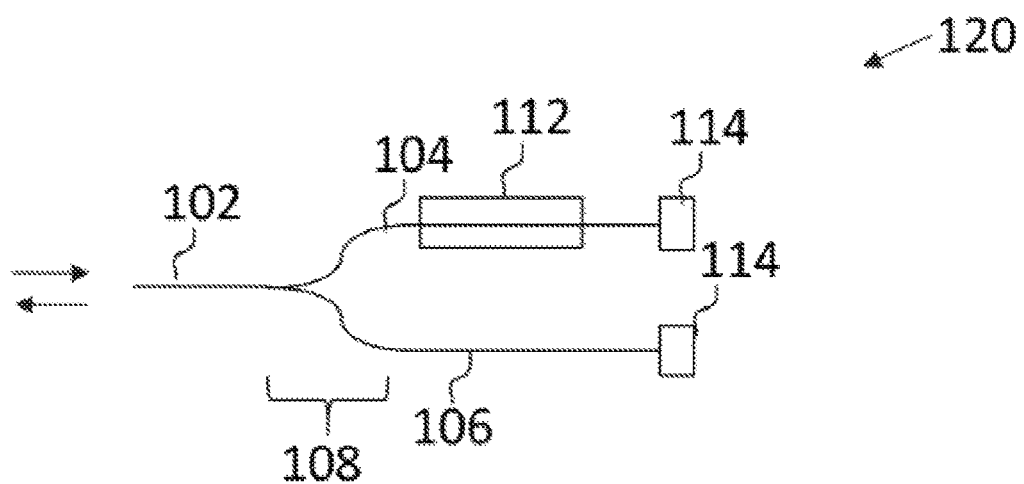
[Fig. 2A]
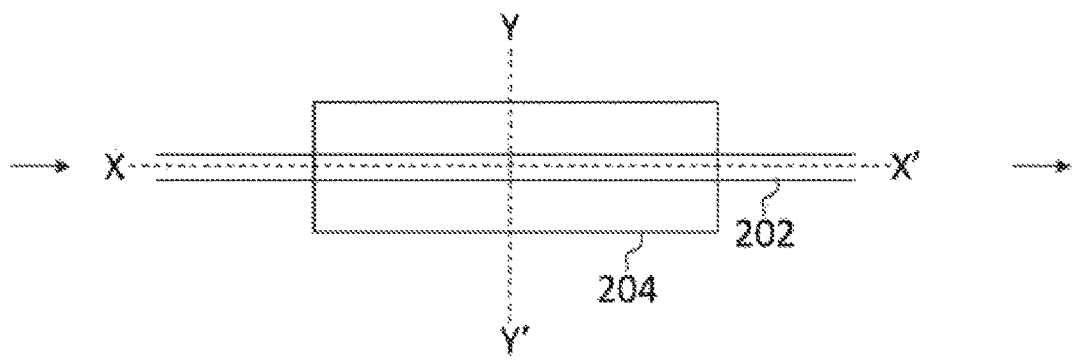

[Fig. 2B]
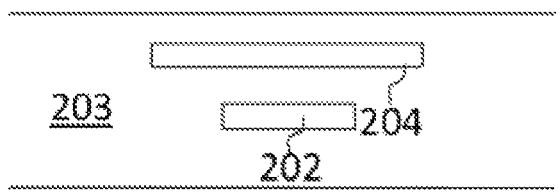
[Fig. 2C]
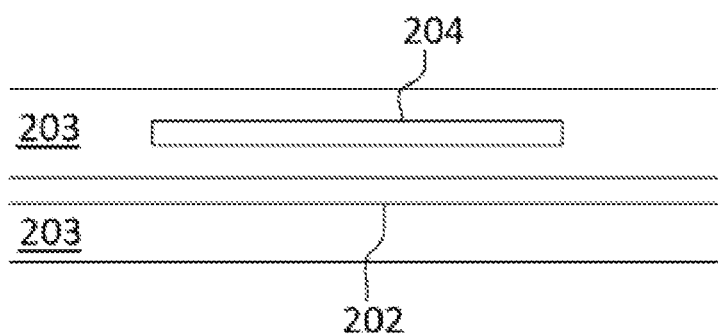
[Fig. 3A]
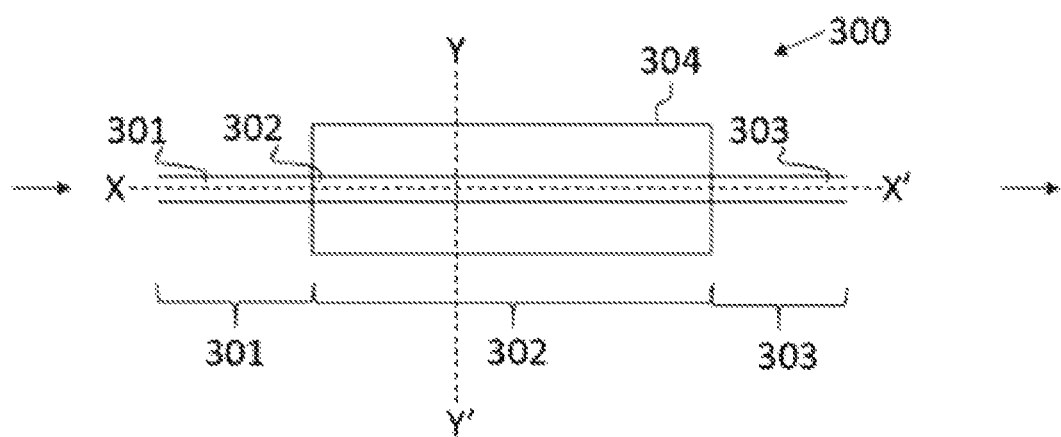

[Fig. 3B]
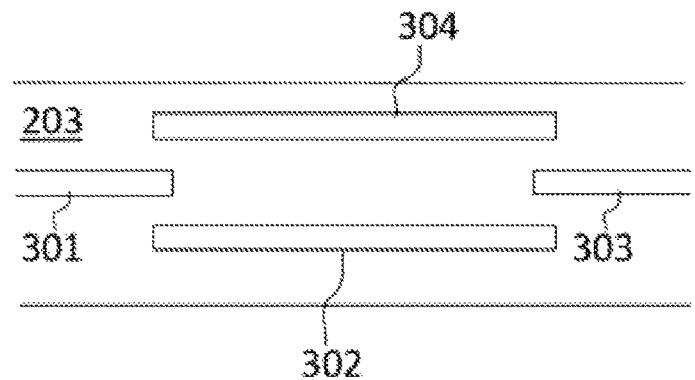
[Fig. 3C]
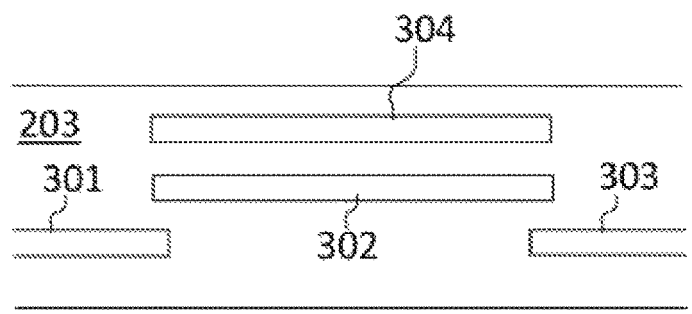
[Fig. 3D]
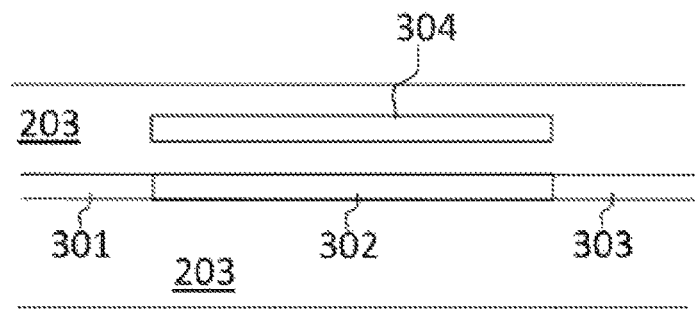
[Fig. 3E]
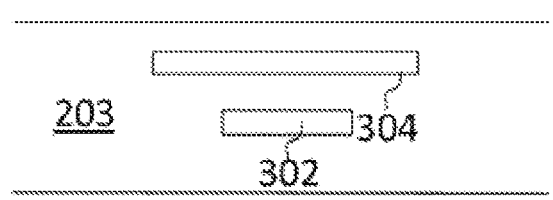

[Fig. 3F]
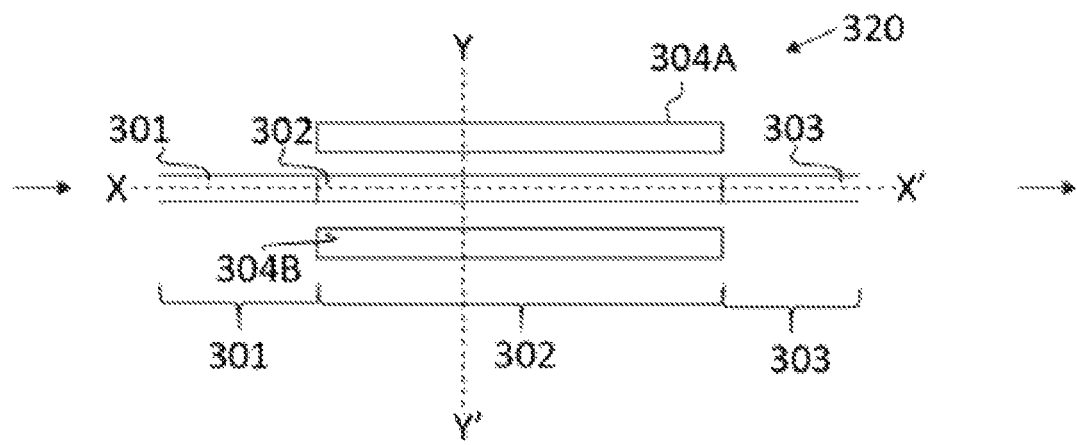
[Fig. 3G]
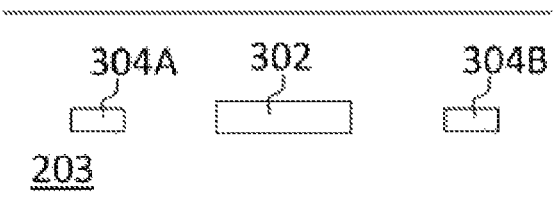
[Fig. 4A]
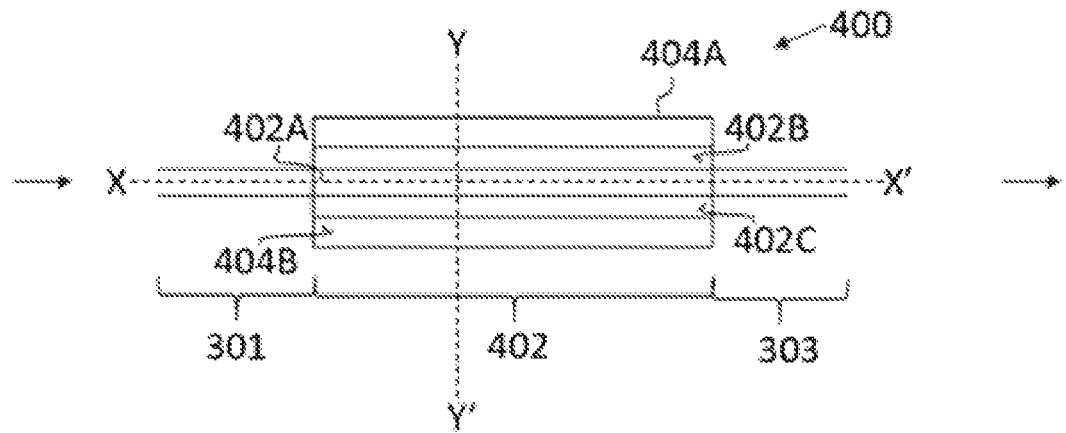

[Fig. 4B]
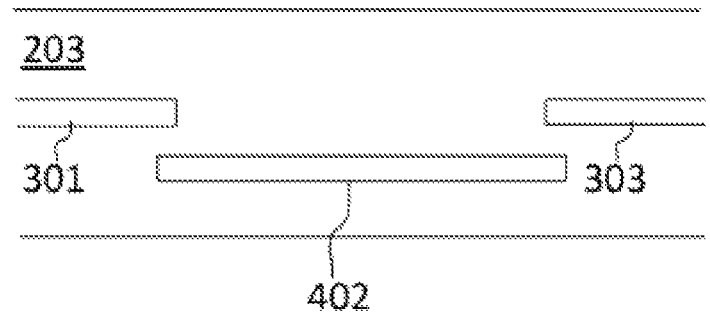
[Fig. 4C]
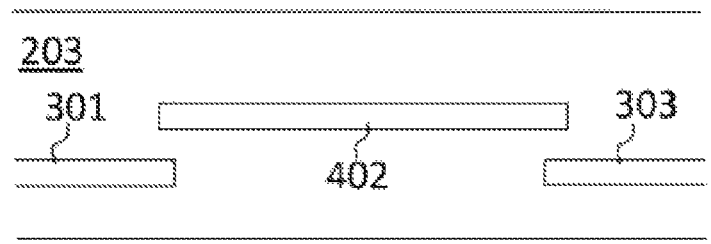
[Fig. 4D]
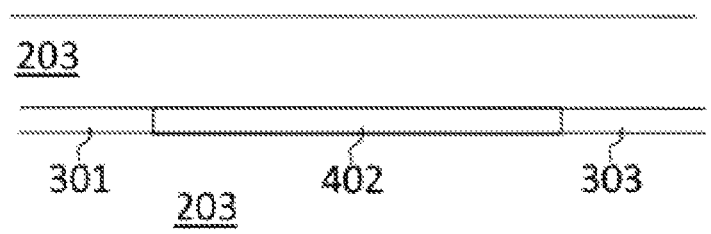
[Fig. 4E]
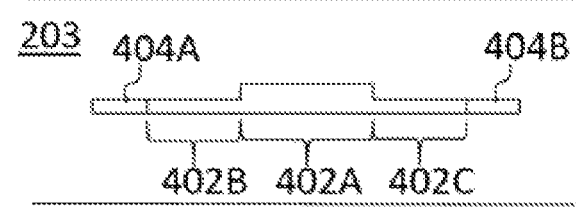

[Fig. 4F]
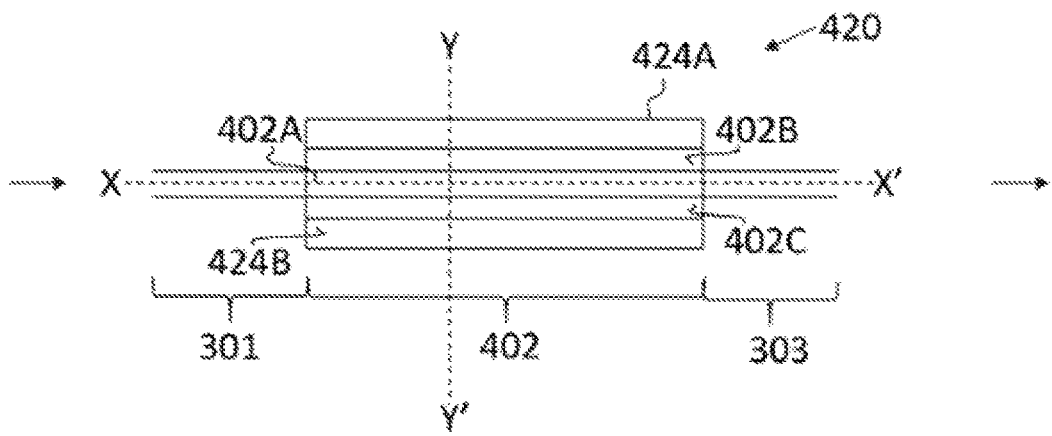
[Fig. 4G]
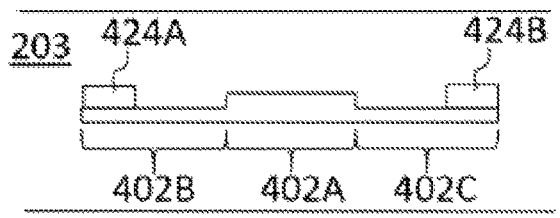
[Fig. 5]
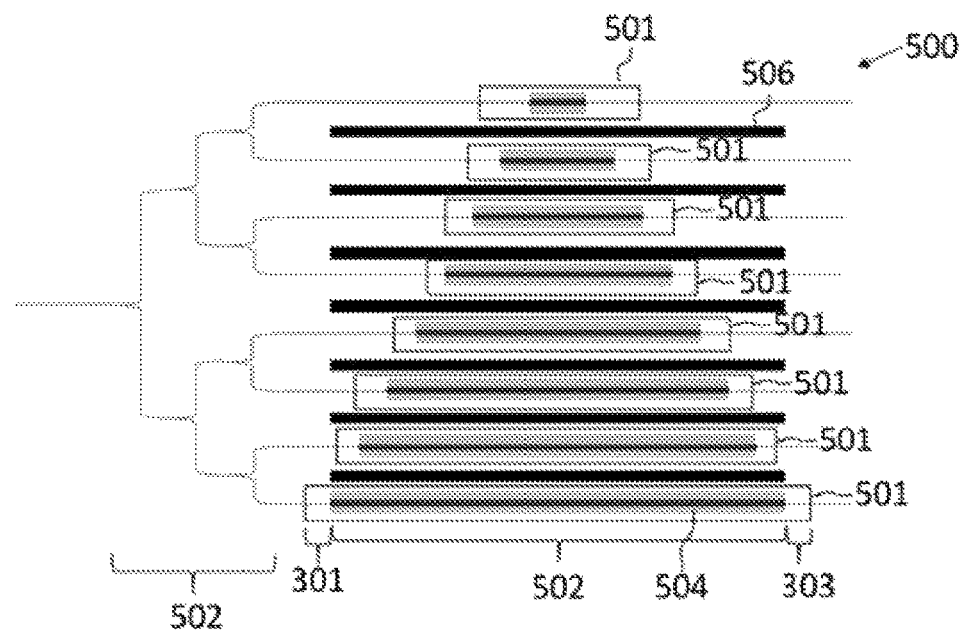

[Fig. 6A]
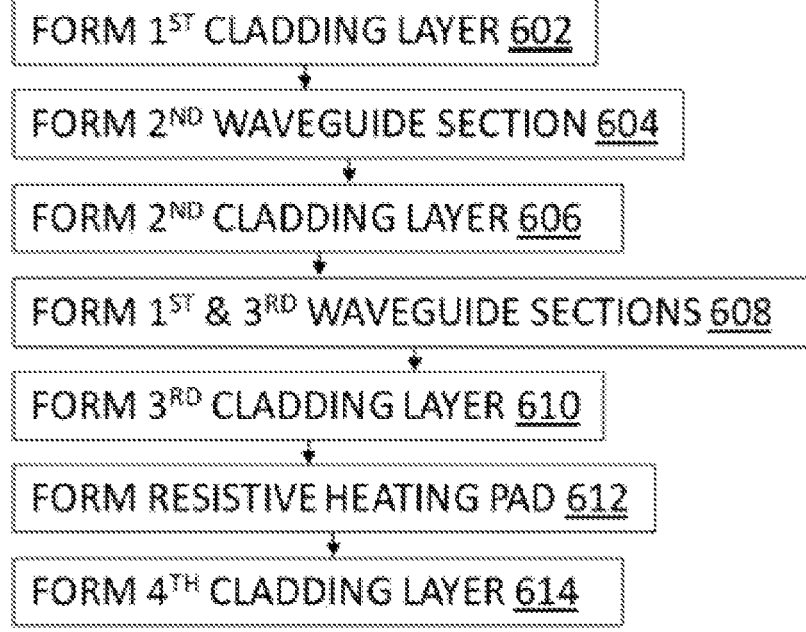
[Fig. 6B]
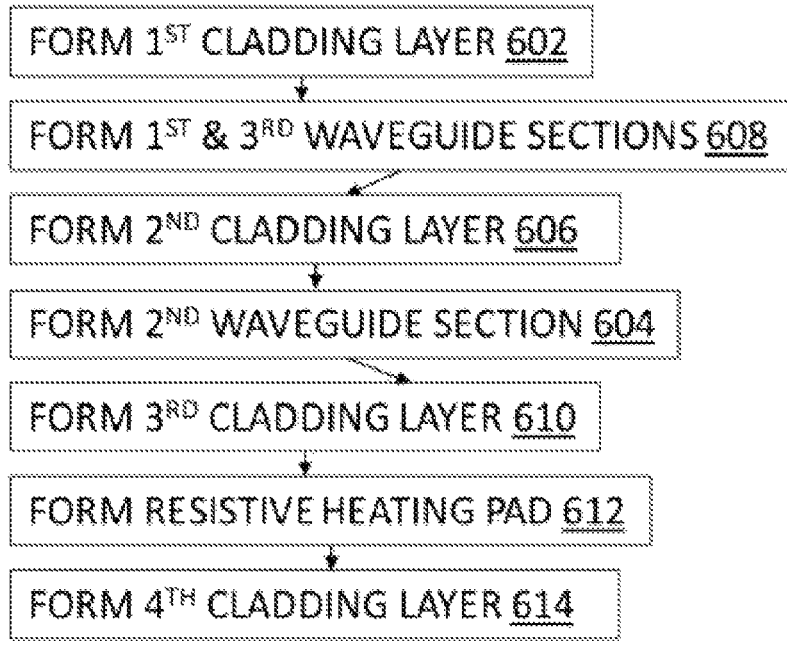

[Fig. 6C]
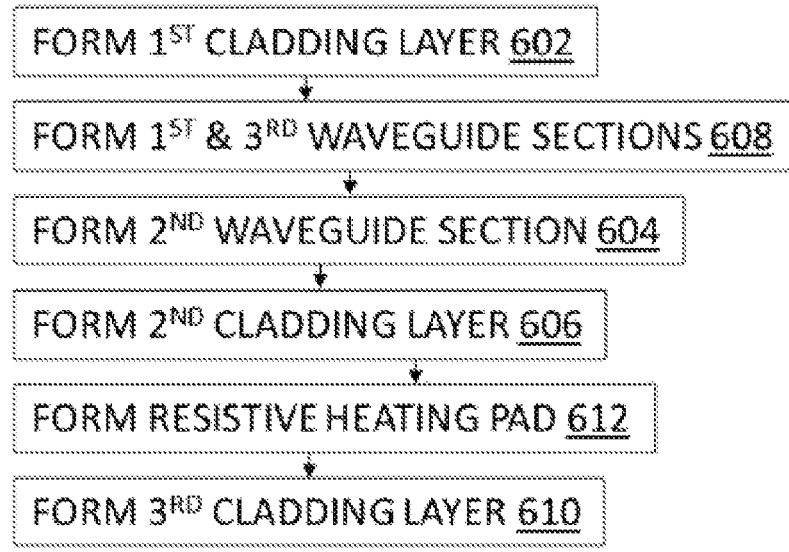
[Fig. 6D]
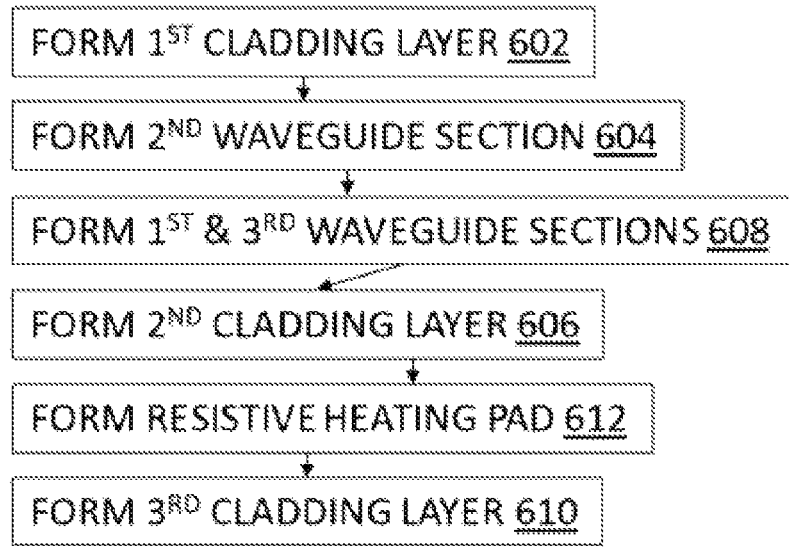

[Fig. 7A]
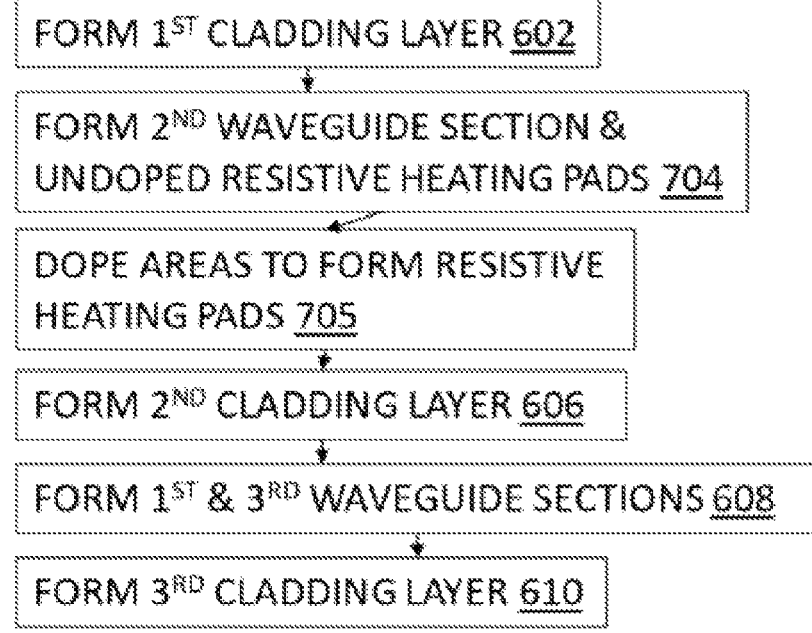
[Fig. 7B]
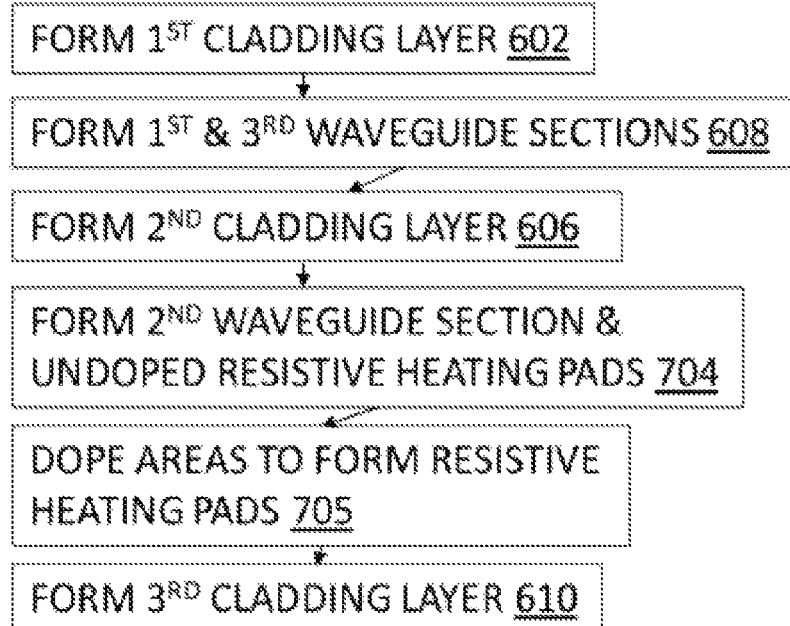

[Fig. 7C]
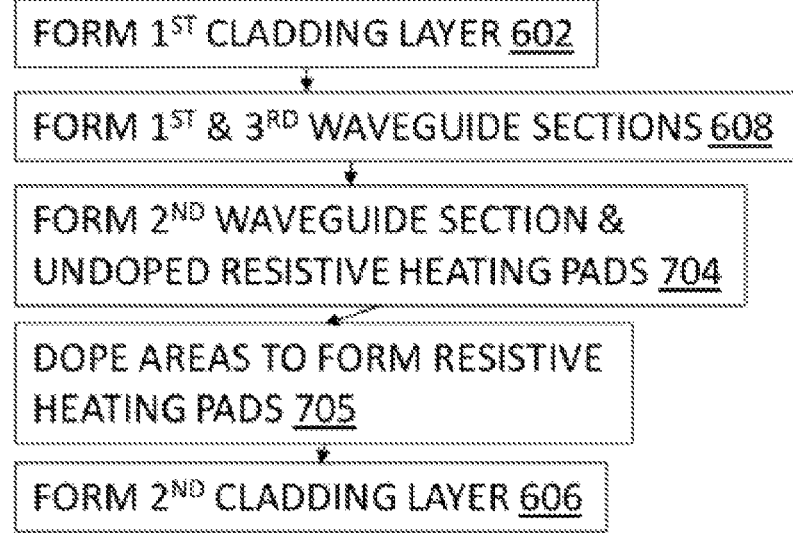
[Fig. 7D]
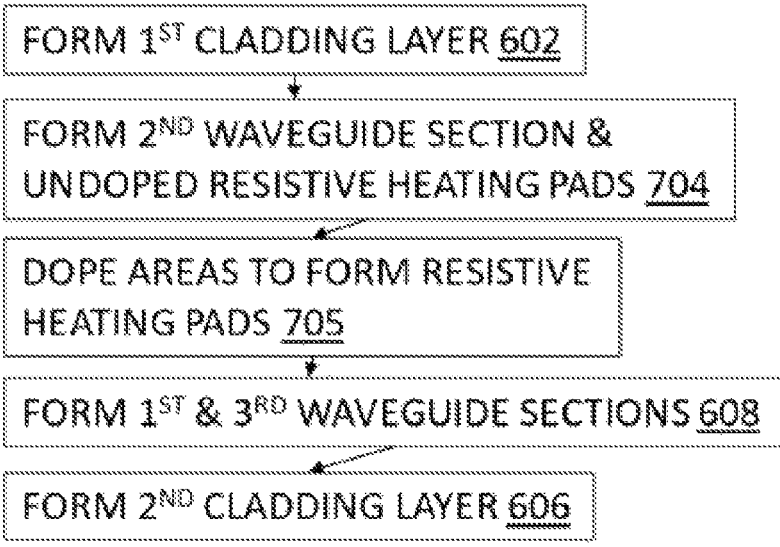

[Fig. 8A]
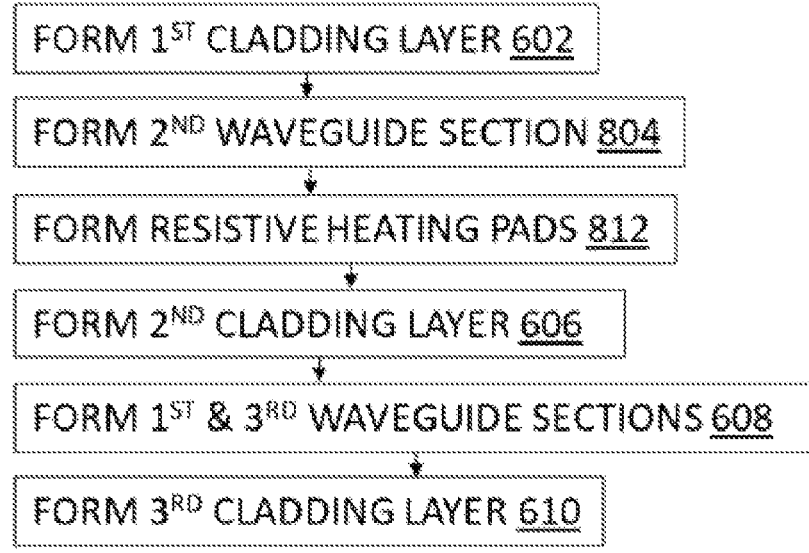
[Fig. 8B]
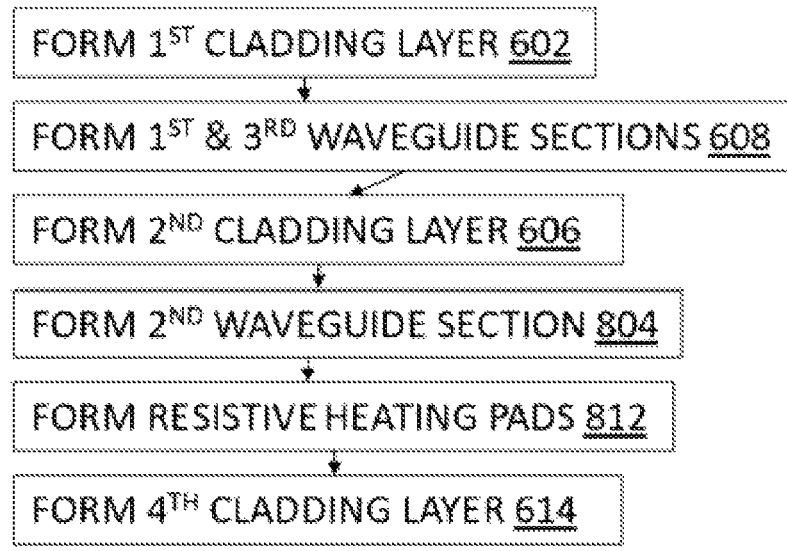

[Fig. 8C]
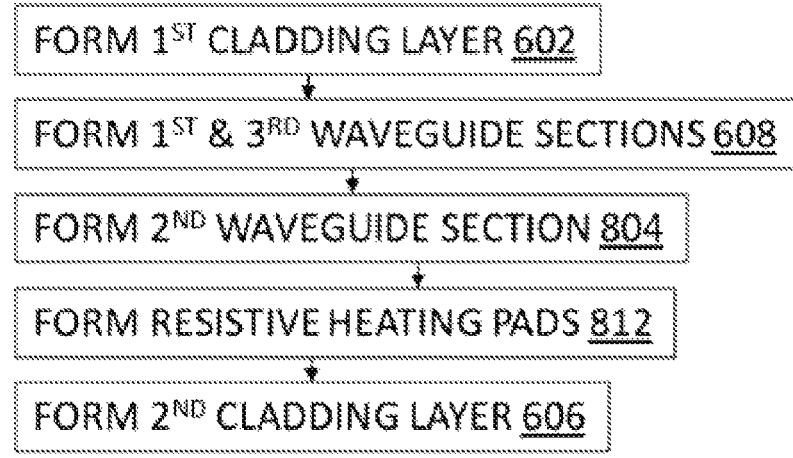
[Fig. 8D]
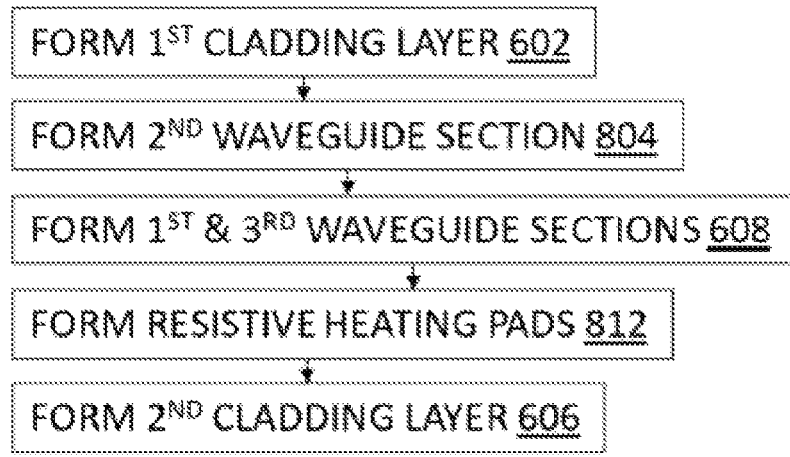

OPTICAL WAVEGUIDE TUNING ELEMENT

BACKGROUND

Optical waveguide devices may be formed on a substrate, such as silicon, with the waveguide cladding being formed from a first material (e.g. silicon oxide) and the core material being substantially square or rectangular in cross-section and formed from a second material with a higher refractive index than cladding material (e.g. silicon, Si, or silicon nitride, SiN, etc.). As light is guided substantially within the core material, the structure formed from the core material is typically referred to as the waveguide without any reference to the cladding material which may, in some examples, be air or dielectric with lower refractive index than the core material. The cross-section dimensions of the waveguide (i.e. the core material) may be dependent, at least in part, on the material used to form the waveguide and in particular on the refractive index of the waveguide material.

A tunable waveguide device may, for example, be fabricated using a movable element (e.g. a MEMS device or a larger optical element), the thermo-optic effect or electro-optic effect. In the latter two examples, the tuning is achieved by changing the optical properties (e.g. the refractive index) of the waveguide (i.e. core) material by passing an electrical current, for example, through a heating element positioned close to the waveguide. Inaccuracies in the motion of the movable element or the change in the optical properties (e.g. due to the lack of control of heating effects in a device using the thermo-optic effect) results in tuning errors and this can significantly impair the performance of the tunable waveguide device.

The embodiments described below are not limited to implementations which solve any or all of the disadvantages of known tunable waveguide devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A tunable element for an optical waveguide device, such as an Optical Phased Array (OPA), is described. Tunable element comprises three waveguide sections arranged such that light propagates through the first waveguide section, then through the second waveguide section and then through the third waveguide section, with light being either evanescently or directly coupled from one waveguide section to the next. The tunable element further comprises one or more resistive heating pads formed proximate to the second waveguide section. The first and third waveguide sections are formed from a first material and the second waveguide section is formed from a second, different material and the second material is more thermo-optically sensitive than the first material.

A first aspect provides a tunable element for an optical waveguide device, the tunable element comprising: a first waveguide section formed from a first material; a second waveguide section formed from a second material and arranged to receive light coupled from the first waveguide section; a third waveguide section formed from the first material and arranged to receive light coupled from the second waveguide section; and one or more resistive heating pads proximate to the second waveguide section, wherein the second material is more thermo-optically sensitive than the first material.

A second aspect provides a tunable optical waveguide device comprising one or more tunable elements described herein.

A third aspect provides an optical phased array comprising one or more tunable elements as described herein.

A fourth aspect provides a method of fabricating a tunable element for an optical waveguide device, the method comprising: forming a first waveguide section and a third waveguide section from a first material; forming a second waveguide section from a second material; forming at least one layer of cladding material on the second waveguide section; and forming one or more resistive heating pads on top of a layer of cladding material and proximate to the second waveguide section, wherein the second material is more thermo-optically sensitive than the first material.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIGS. 1A and 1B show schematic diagrams of two example tunable waveguide devices;

FIGS. 2A, 2B and 2C show schematic diagrams of a known tuning element for use in a tunable waveguide device;

FIG. 3A is a schematic diagram of a first example improved tuning element for use in a tunable waveguide device;

FIGS. 3B, 3C and 3D show cross-sections through three different variants of the improved tuning element shown in FIG. 3A;

FIG. 3E shows a further cross-section through an improved tuning element shown in FIG. 3A;

FIG. 3F is a schematic diagram of a second example improved tuning element for use in a tunable waveguide device;

FIG. 3G is a cross-section through the improved tuning element shown in FIG. 3F;

FIG. 4A is a schematic diagram of a third example improved tuning element for use in a tunable waveguide device;

FIGS. 4B, 4C and 4D show cross-sections through three different variants of the improved tuning element shown in FIG. 4A;

FIG. 4E shows a further cross-section through an improved tuning element shown in FIG. 4A;

FIG. 4F is a schematic diagram of a fourth example improved tuning element for use in a tunable waveguide device;

FIG. 4G is a cross-section through the improved tuning element shown in FIG. 4F;

FIG. 5 is a schematic diagram of an example tunable waveguide device comprising a plurality of improved tuning elements; and FIGS. 6A, 6B, 6C and 6D show four different example methods of manufacture of an improved tuning element for use in a tunable waveguide device;

FIGS. 7A, 7B, 7C and 7D show four different example methods of manufacture of an improved tuning element for use in a tunable waveguide device; and FIGS. 8A, 8B, 8C and 8D show four different example methods of manufacture of an improved tuning element for use in a tunable waveguide device.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, a tunable waveguide device (e.g. an OPA or VOA (variable optical attenuator)) may, for example, be fabricated using the thermo-optic effect. Such a tunable waveguide device operates by splitting an optical path 102 into multiple optical paths 104, 106, each of the multiple optical paths comprising a separate waveguide, introducing a variable phase change into one or more of the optical paths (using one or more tuning elements 112 that rely upon the thermo-optic effect) and subsequently recombining light from some or all of the multiple optical paths. Any phase changes that are introduced by the one or more tuning elements 112, cause the light to recombine differently (e.g. as a consequence of interference between the light from the different optical paths). An example tunable waveguide device 100 is shown in FIG. 1A.

The tuning element 112 is capable of changing the phase of the light that is output and this phase change is achieved by changing the optical properties (i.e. the refractive index) of the waveguide (i.e. core) material within the tuning element by heating the waveguide. The heating may be achieved passing an electrical current through a resistive heating pad (which may, for example, be formed from a metal, a doped silicon strip, or other material) that is positioned close to (e.g. above or beside) the waveguide.

Whilst FIG. 1A shows an example tunable waveguide device in which the light is split and then recombined using two different splitter structures 108, 110, in other examples, such as the second example tunable waveguide device 120 shown in FIG. 1B, the waveguides forming each of the multiple optical paths may be terminated with a reflective element 114 such that the same splitter structure 108 is used both to split and to recombine the light. Whilst the two example devices 100, 120 shown in FIGS. 1A and 1B show light being split into two optical paths, in other examples, the light may be split into more than two optical paths (e.g. into eight optical paths) using any suitable splitter arrangement.

In the example devices 100, 120 shown in FIGS. 1A and 1B, there is a single tuning element 112 in one of the multiple optical paths 104, 106; however in other examples there may be tuning elements in more than one of the multiple optical paths and in various examples there may be tuning elements in each of the multiple optical paths. In examples where a tunable element is included within more than one of the multiple optical paths, the tunable elements within different optical paths may introduce different phase changes (e.g. through different dimensions of tunable element and/or passing different currents through the resistive heating pads within the tunable element). Various techniques, such as trenches formed in the cladding material, may be used to provide thermal isolation between adjacent tunable elements.

FIG. 2A shows a schematic diagram (in planar view) of a tunable element in a waveguide device (e.g. tunable element 112). The tunable element comprises a waveguide (i.e. waveguide core) 202 and a resistive heating pad 204. The direction of propagation of the light is shown by the arrows in FIG. 2A although as described above (e.g. with reference to FIG. 1B), in various examples the light may also propagate in the opposite direction through the tunable element.

FIGS. 2B and 2C show two example cross-sections through the tunable element of FIG. 2A. The first cross-section, shown in FIG. 2B, is taken perpendicular to the direction of propagation of the light through the waveguide 202, as indicated by the dotted line Y-Y' in FIG. 2A and the second cross-section, shown in FIG. 2C, is taken through the centre of the waveguide 202 and along the direction of propagation of the light through the waveguide 202, as indicated by the dotted line X-X' in FIG. 2A.

As shown in FIGS. 2B and 2C, the waveguide 202 is surrounded by a cladding material 203. In FIGS. 2B and 2C the resistive heating pad 204 is shown as being formed in a layer above the waveguide 202 and there is a thin layer of the cladding material 203 between the waveguide 202 and the heating pad 204. In other examples, however, the resistive heating pad 204 may be formed in a layer below the waveguide 202 or may be formed in substantially the same plane as the waveguide 202 and adjacent to the waveguide 202. In many examples (e.g. where the heating pad 204 is formed from a metal) there is a layer of the cladding material 203 between the waveguide 202 and the heating pad 204 (e.g. to prevent absorption of the metal into the waveguide 202) and this layer may, for example, range from less than a micrometer to a few micrometers in thickness. The thickness of the layer may, for example, be selected based on an optical loss target and the thermal efficiency of the device.

Heating of the waveguide 202 by the resistive heating pad 204 changes the refractive index in the heated portion of the waveguide 202 and this change in refractive index results in a phase change in the light output from the tunable element. Any lack of control or precision in the heating of the waveguide 202 (e.g. any unpredictable or variable spreading of heat in the waveguide 202), results in a phase error and this can significantly impair the performance of the tunable waveguide device comprising the tunable element.

Described herein is an improved tunable element in which the phase error that is introduced through the heating of the waveguide is reduced or eliminated. Such an improved tunable element may form part of any tunable waveguide device (e.g. an OPA or VOA) and/or integrated photonics system. As described in detail below, the improved tunable element comprises three adjacent waveguide sections along the direction of propagation of the light, such that light is coupled from the first section into the second section and from the second section into the third section. The first and third sections are formed from a first material (e.g. SiN or SiON) or material combination and the second section is formed from a second material (e.g. silicon, amorphous silicon or polycrystalline silicon) or material combination that is more thermo-optically sensitive than the first material. The improved tunable element further comprises a resistive heater pad that has a length (measured along the direction of propagation of the light) that is the same as the length of the second section. All three sections of waveguide are surrounded by a cladding material (e.g. silicon oxide or polymer).

The first and third sections may be referred to as 'input', 'output' or 'input/output' sections of waveguide and the second section may be referred to as the 'centre' section of waveguide. As described above, light propagates through the first section, then through the second section and then through the third section (or in the opposite order, for light propagating in the opposite direction).

The term 'thermo-optic sensitivity' is used herein to refer to the change in refractive index with temperature (denoted dn/dT, where do is the change in refractive index that occurs for a change in temperature dT), with a higher thermo-optic sensitivity referring to a material with a larger value of dn/dT.

By using a material with a higher thermo-optic sensitivity for only the portion of the waveguide that is proximate to the resistive heating pad, i.e. the second section, any phase change that is caused by unintentional heating of the other (less thermo-optically sensitive) waveguide material, i.e. the first and/or third section, will be significantly smaller than the phase change caused by heating of the second section. This phase change due to unintentional heating (e.g. heat spreading beyond the second section of waveguide) contributes to the phase error and hence the phase error is reduced compared to a tuning element (e.g. as shown in FIGS. 2A-2C) where the entire waveguide (i.e. waveguide core) is formed from the same material.

Additionally, by using a material with a higher thermo-optic sensitivity for the portion of the waveguide that is proximate to the resistive heating pad, i.e. the second section, less energy is required to produce a desired phase change in the propagating light and hence the overall tunable element 300 is more efficient compared to a tunable device with a waveguide formed entirely from the first material.

Additionally, by only using the material with higher thermo-optic sensitivity for the portion of the waveguide that is proximate to the resistive heating pad, i.e. the second section, and not for the rest of the waveguide, i.e. the first and third sections, the overall optical loss of the system may be reduced. For example, where Si is used for the second section, the waveguide loss may be 1.5 dB/cm, whereas the waveguide loss for SiN (which may be used for the first and third sections) may be less than 0.5 dB/cm.

FIG. 3A shows a schematic diagram (in planar view) of an example improved tunable element 300. This improved tunable element may, for example, be incorporated in a waveguide device such as shown in FIGS. 1A and 1B (e.g. tunable element 112). The improved tunable element 300 comprises three waveguide (i.e. waveguide core) sections 301-303 and a resistive heating pad 304 (which may, for example, be formed from titanium nitride, TiN). The direction of propagation of the light is shown by the arrows in FIG. 3A although as described above (e.g. with reference to FIG. 1B), in various examples the light may also propagate in the opposite direction through the tunable element 300.

As described above, the first and third waveguide sections 301, 303 are formed from a first material having a first value of dn/dT, S1, and the second (or centre) waveguide section 302 is formed from a second material having a second value of dn/dT, S2. The second material is more thermo-optically sensitive than the first material, i.e. S2>S1.

In an example, the first material is silicon nitride, SiN, and $S1=2.4 \times 10^{-5}$ and the second material is silicon, Si, and $52=1.8 \times 10^{-4}$. In this example, the thermo-optic sensitivity of the second material is an order of magnitude larger than the thermo-optic sensitivity of the first material. Consequently, any change in refractive index in the first and/or third sections of waveguide which are caused by heating from the resistive heating pad, will result in a phase change (and hence phase error) that is very small (e.g. negligible) compared to the phase change caused by heating of the second waveguide section.

Silicon and silicon nitride provide just one example combination of materials which may be used to form the three waveguide sections 301-303. In other examples, polycrystalline or amorphous silicon may be used for the second waveguide section 302. In another example, the first material is SiON and the second material is silicon, polycrystalline or amorphous silicon. In a further example, the first material is SiON and the second material is SiN. In further examples, any combination of materials may be used where the second material has a higher thermo-optic sensitivity than the first material. In other examples, the first and third sections may not be fabricated from a single material but instead may be formed from a first material combination (e.g. a multi-layer structure that forms the waveguide core). Similarly, the second section may not be fabricated from a single material but instead may be formed from a second material combination (e.g. a second multi-layer structure, different to that used for the first and third sections, that forms the waveguide core).

The first and third waveguide sections 301, 303 may be formed in the same layer and so may be co-planar. The second waveguide section 302 may be formed in a separate process step (as it is formed from a different material) and may be formed in a separate layer to the first and third waveguide sections, as shown in FIGS. 3B and 3C. The fabrication process is described below with reference to FIGS. 6A-6D.

FIGS. 3B, 3C and 3D show three different alternative cross-sections through the tunable element 300 of FIG. 3A and in all these diagrams, the cross-section is taken through the centre of the waveguide sections 301-303 and along the direction of propagation of the light through the waveguide sections 301-303, as indicated by the dotted line X-X' in FIG. 3A. In all examples, the waveguide sections 301-303 are surrounded by a cladding material 203 and in all examples shown, the length of the second waveguide section 302 (as measured along the direction of propagation of the light) is the same as the length of the resistive heating pad 304 and the ends of the second waveguide section 302 and the ends of the resistive heating pad 304 are aligned (in a direction parallel to the direction of propagation of the light). In other examples (not shown in the figures), however, the length of the second waveguide section 302 (as measured along the direction of propagation of the light) may be longer (e.g. only slightly longer) than the length of the resistive heating pad 304, such that the resistive heating pad 304 terminates before the end(s) of the second waveguide section 302. In the first two examples, as shown in FIGS. 3B and 3C, a multi-layer waveguide structure is formed, with the second waveguide section 302 being in a plane (or layer) which is parallel to, but spaced from, the plane (or layer) of the first and third waveguide sections 301, 303. Light is coupled vertically from the end of the first waveguide section 301 and into the second waveguide section 302 (i.e. into a proximate end of the second waveguide section 302) and then coupled vertically from the other end of the second waveguide section 302 and into the third waveguide section 303 (i.e. into a proximate end of the third waveguide section 303).

To improve the efficiency of the vertical coupling, the waveguide sections may overlap by a small amount (i.e. the first and second waveguide sections overlap by a small amount and the second and third waveguide sections overlap by a small amount), as shown in FIGS. 3B and 3C. This means that the resistive heating pad 304 may overlap the ends of the first and third waveguide sections; however, due to the reduced thermal sensitivity of the material from which the first and third waveguide sections are formed, any phase error that is introduced as a consequence of this overlap is very small.

In the first example, shown in FIG. 3B, plane of the second waveguide section 302 is further away from the resistive heating pad 304 than the plane of the first and third waveguide sections 301, 303, i.e. in the orientation shown in FIG. 3B, the plane for the first and third waveguide sections 301, 303 is above the plane of the second waveguide section 302 and below the plane of the resistive heating pad 304. In the second example, shown in FIG. 3C, the plane of the second waveguide section 302 is closer to the resistive heating pad 304 than the plane of the first and third waveguide sections 301, 303, i.e. in the orientation shown in FIG. 3C, the plane for the first and third waveguide sections 301, 303 is below both the plane of the second waveguide section 302 and that plane is, in turn, below the plane of the resistive heating pad 304.

In the third example cross-section, shown in FIG. 3D, there is not a multi-layer waveguide structure and instead all three waveguide sections 301-303 are in substantially the same plane, with light being butt-coupled between the first and second sections 301, 302 and between the second and third sections 302, 303. Dependent upon the manner in which the vertical coupling (in the examples of FIGS. 3B and 3C) is achieved, butt-coupling may be more lossy and hence the multi-layer structure of FIG. 3B or 3C may result in a tunable element that has less optical loss.

FIG. 3E shows a further cross-section through the tunable element 300 shown in FIG. 3A; however, unlike the earlier cross-sections (shown in FIGS. 3B-3D), the cross-section shown in FIG. 3E is taken perpendicular to the direction of propagation of the light through the second section of waveguide 302, as indicated by the dotted line Y-Y' in FIG. 3A. As shown in FIG. 3E, although the resistive heating pad 304 is the same length as the second section of waveguide 302, as measured along the direction of propagation, the resistive heating pad 304 may be wider than the second section of waveguide 302, as measured perpendicular to the direction of propagation, although in other examples the width of the resistive heating pad 304 and the second section of waveguide 302 may be the same or the resistive heating pad 304 may be narrower than the second section of waveguide 302.

Whilst FIGS. 3A-3E show the dimensions of the waveguide sections (e.g. width and thickness, with the width being measured perpendicular to the direction of propagation and in the plane of the waveguide section and thickness being measured perpendicular to both the direction of propagation and the plane of the waveguide section) being substantially the same, in most examples, the width and/or thickness of the second waveguide section 302 is different to the width and/or thickness of the first and third waveguide sections 301, 303, with the first and third waveguide sections 301, 303 having identical width and thickness. Whilst the actual dimensions of the different waveguide sections may be chosen when designing the tuning element 300 (or the waveguide device comprising the tuning element 300), if the refractive index of the second material (that forms the second waveguide section 302) is higher than the refractive index of the first material, then propagating light is more strongly confined within the waveguide and the width and/or thickness of the second waveguide section 302 may be smaller than the width and/or thickness of the first and third waveguide sections 301, 303. In an example, the first and third waveguide sections 301, 303 may be formed from SiN (n=2) and be 400 nm thick and 1000 nm wide, whereas the second waveguide section 302 may be formed from Si (n=3.5) and may be 220 nm thick and 500 nm wide.

Furthermore, whilst FIGS. 3B-3E show the resistive heating pad 304 being formed above all of the waveguide sections 301-303, in other examples, the orientation may be inverted, such that the resistive heating pad 304 may be formed in a plane lower than all of the waveguide sections 301-303.

In a variation on the tunable element 300 shown in FIGS. 3A-3E and described above, is shown in FIGS. 3F and 3G. In this example tunable element 320, instead of a single resistive heating pad 304 in a layer above or below the second waveguide section 302, there are two resistive heating pads 304A, 304B, one either side of the second waveguide section 402 and substantially in the same plane (or layer) as the second waveguide section 402. FIG. 3F shows a planar view and the cross-section along the direction of propagation of the light through the waveguide sections 301-303, as indicated by the dotted line X-X' in FIG. 3F, may be as shown in any of FIGS. 3B-3D with the omission of the resistive heating pad 304. FIG. 3G shows a further cross-section through the tunable element 320 shown in FIG. 3F taken perpendicular to the direction of propagation of the light through the second section of waveguide 302, as indicated by the dotted line Y-Y' in FIG. 3F. This cross-section shows that the two resistive heating pads 304A, 304B formed in the same plane as the second waveguide section 302 and are positioned either side of the second waveguide section 202. The resistive heating pads 304A, 304B may be formed from any suitable material, for example, TiN, and may be the same thickness as, or thicker or thinner than the centre waveguide section 302.

FIG. 4A shows a schematic diagram (in planar view) of another example improved tunable element 400. This tunable element 400 is a variant on that described above with reference to FIGS. 3A-3E and as is described in more detail below. In this variant, shown in FIG. 4A, the first and third waveguide sections 301, 303 are as described above with reference to FIGS. 3A-3E; however the second waveguide section 402 differs in cross-section from the second waveguide section 302 described above. The second waveguide section 402 in this variant is a rib waveguide and hence has a portion 402A in the centre of the waveguide that is thicker than the two outer portions 402B, 402C and this is also shown in FIG. 4E (described below). The thickness of the centre portion 402A may be approximately the same thickness as the second waveguide section 302 in the earlier examples. Furthermore, the resistive heating pad arrangement in tunable element 400 differs from the resistive heating pad 304 in tunable element 300. In particular, instead of a single resistive heating pad 304 in a layer above or below the second waveguide section 302, there are two resistive heating pads 404A, 404B, one either side of the second waveguide section 402 and substantially in the same plane (or layer) as the second waveguide section 402 and these may, for example, be formed from doped silicon, instead of being formed from one or more metals (e.g. TiN). Any suitable dopants may be used (e.g. p-type or n-type) and the thermal efficiency will depend upon the resistance of the heating pads and hence on the doping concentration. The direction of propagation of the light is shown by the arrows in FIG. 4A although as described above (e.g. with reference to FIG. 1B), in various examples the light may also propagate in the opposite direction through the tunable element 400.

The two resistive heating pads 404A, 404B may be referred to as resistive regions of the second material. These are formed by implanting impurities into the region (i.e. doping) and this modifies the local resistivity of this part of the structure formed from the second material. As described above, the first and third waveguide sections 301, 303 are formed from a first material having a first value of dn/dT, S1, and the second (or centre) waveguide section 402 is formed from a second material having a second value of dn/dT, S2. The second material is more thermo-optically sensitive than the first material, i.e. S2>S1.

The first and third waveguide sections 301, 303 may be formed in the same layer and so may be co-planar. The second waveguide section 402 may be formed in a separate process step (as it is formed from a different material) and may be formed in a separate layer to the first and third waveguide sections, as shown in FIGS. 4B and 4C. The fabrication process is described below with reference to FIGS. 7A-&D.

FIGS. 4B, 4C and 4D show three different alternative cross-sections through the tunable element 400 of FIG. 4A and in all these diagrams, the cross-section is taken through the centre of the waveguide sections 301, 402, 303 and along the direction of propagation of the light through the waveguide sections 301, 402, 303 as indicated by the dotted line X-X' in FIG. 4A. In all examples, the waveguide sections 301, 402, 303 are surrounded by a cladding material 203 and in all examples shown, the length of the second waveguide section 402 (as measured along the direction of propagation of the light) is the same as the length of the resistive heating pads 404A, 404B and the ends of the second waveguide section 402 and the ends of the resistive heating pads 404A, 404B are aligned (in a direction parallel to the direction of propagation of the light). In other examples (not shown in the figures), however, the length of the second waveguide section 402 (as measured along the direction of propagation of the light) may be longer (e.g. only slightly longer) than the length of the resistive heating pad pads 404A, 404B, such that the resistive heating pads 404A, 404B terminate before the end(s) of the second waveguide section 402.

In the first two examples, as shown in FIGS. 4B and 4C, a multi-layer waveguide structure is formed, with the second waveguide section 402 being in a plane (or layer) which is parallel to, but spaced from, the plane (or layer) of the first and third waveguide sections 301, 303. Light is coupled vertically from the end of the first waveguide section 301 and into the second waveguide section 402 (i.e. into a proximate end of the second waveguide section 402) and then coupled vertically from the other end of the second waveguide section 402 and into the third waveguide section 303 (i.e. into a proximate end of the third waveguide section 303). To improve the efficiency of the vertical coupling, the waveguide sections may overlap by a small amount (i.e. the first and second waveguide sections overlap by a small amount and the second and third waveguide sections overlap by a small amount), as shown in FIGS. 4B and 4C. In the first example, shown in FIG. 4B, the plane for the first and third waveguide sections 301, 303 is above the plane of the second waveguide section 402 and in the second example, shown in FIG. 4C, the plane for the first and third waveguide sections 301, 303 is below the plane of the second waveguide section 402.

In the third example cross-section, shown in FIG. 4D, there is not a multi-layer waveguide structure and instead all three waveguide sections 301, 402, 303 are in substantially the same plane, with light being butt-coupled between the first and second sections 301, 402 and between the second and third sections 402, 303. As described above, dependent upon the manner in which the vertical coupling (in the examples of FIGS. 4B and 4C) is achieved, butt-coupling may be more lossy and hence the multi-layer structure of FIG. 4B or 4C may result in a tunable element that has less optical loss.

FIG. 4E shows a further cross-section through the tunable element 400 shown in FIG. 4A; however, unlike the earlier cross-sections (shown in FIGS. 4B-4D), the cross-section shown in FIG. 4E is taken perpendicular to the direction of propagation of the light through the second section of waveguide 402, as indicated by the dotted line Y-Y' in FIG. 4A. This cross-section shows the difference in thickness between the centre portion 402A of the second waveguide section and the outer portions 402B, 402C. As shown in FIG. 4E, the resistive heating pads 404A, 404B are formed in the same plane as the second waveguide section 402 and are positioned either side of the second waveguide section 402 and adjacent to the outer portions 402B, 402C of the second waveguide section 402. As described below, the resistive heating pads 404A, 404B may be initially formed (e.g. deposited) in the same process step and from the same material as the second waveguide section 402 and then a further process step used to dope (i.e. to selectively dope) the portions of the material that are to form the resistive heating pads 404A, 404B.

In a variation on the tunable element 400 shown in FIGS. 4A-4E and described above, is shown in FIGS. 4F and 4G. In this example tunable element 420, instead of the resistive heating pads 424A, 424B being formed from doped silicon (as described above), they are formed from another material that is deposited onto the outer portions 402B, 402B of the second waveguide section 402. FIG. 4F shows a planar view and the cross-section along the direction of propagation of the light through the waveguide sections 301, 402, 303, as indicated by the dotted line X-X' in FIG. 4F, may be as shown in any of FIGS. 4B-4D and described above. FIG. 4G shows a further cross-section through the tunable element 420 shown in FIG. 4F taken perpendicular to the direction of propagation of the light through the second section of waveguide 402, as indicated by the dotted line Y-Y' in FIG. 4F. This cross-section shows that the two resistive heating pads 424A, 424B deposited onto the distal parts of the outer portions 402B, 402B of the second waveguide section 402. The resistive heating pads 424A, 424B may be formed from any suitable material, for example, TiN, and may be the same thickness as, or thicker or thinner than the resistive heating pad 304 described above with reference to FIGS. 3A-3G. Whilst FIGS. 4B-4C show the dimensions of the thicker part of the second waveguide section 402A and the first and third waveguide sections 301, 303 (e.g. width and thickness, with the width being measured perpendicular to the direction of propagation and in the plane of the waveguide section and thickness being measured perpendicular to both the direction of propagation and the plane of the waveguide section) being substantially the same, in most examples, the width and/or thickness of the thicker portion 402A of the second waveguide section is different to the width and/or thickness of the first and third waveguide sections 301, 303, with the first and third waveguide sections 301, 303 having identical width and thickness. Whilst the actual dimensions of the different waveguide sections may be chosen when designing the tuning element 400 (or the waveguide device comprising the tuning element 400), if the refractive index of the second material (that forms the second waveguide section 402) is higher than the refractive index of the first material, then propagating light is more strongly confined within the waveguide and the width and/or thickness of the thicker portion 402A of the second waveguide section may be smaller than the width and/or thickness of the first and third waveguide sections 301, 303. In an example, the first and third waveguide sections 301, 303 may be formed from SiN (n=2) and be 400 nm thick and 1000 nm wide, whereas the second waveguide section 402 may be formed from Si (n=3.5) and the thicker portion 402A may be 220 nm thick and 500 nm wide, whilst the outer portions 402B, 402C and resistive heating pads 404A, 404B may be significantly thinner (e.g. a few tens of nanometers).

In all the examples described above, the first and third waveguide sections 301, 303 are formed from a first material having a first value of dn/dT, S1, and the second (or centre) waveguide section 302 is formed from a second material having a second value of dn/dT, S2. The second material is more thermo-optically sensitive than the first material, i.e. S2>S1. In a variation of any of the examples described above, the first and third waveguide sections may be formed from different materials, e.g. the first waveguide section may be formed from a first material having a first value of dn/dT, S1, and the third waveguide section may be formed from a third material having a third value of dn/dT, S3, where the second material (that forms the second waveguide section) is more thermo-optically sensitive than both the first material and the third material, i.e. S2>S1 and S2>S3, The improved tunable elements 300, 320, 400, 420 described above with reference to FIGS. 3A-3G and 4A-4G may be incorporated into (i.e. form part of) any tunable waveguide device and two examples, 100, 120 are shown in FIGS. 1A and 1B. Another example tunable waveguide device 500 is shown in FIG. 5. The tunable waveguide device 500 shown in FIG. 5 is an OPA (optical phased array) and comprises a single input waveguide (shown on the left of FIG. 5), a plurality of tunable elements 501 (eight in the example shown in FIG. 5) and a plurality of output waveguides (shown on the right of FIG. 5). The tunable elements 501 shown in FIG. 5 may be as described above with reference to any of FIGS. 3A-3G and FIGS. 4A-4G or any combination of the tunable elements (or parts thereof) described above. As shown in FIG. 5, in the tunable waveguide device 500, an arrangement of splitters 502 is formed which is configured to split incoming light into a plurality of separate optical paths (eight in the example shown in FIG. 5) and each of these separate optical paths comprises a tunable element 501 (e.g. a tunable element 300, 320, 400, 420). In the example shown in FIG. 5, the tunable element 501 in each path has a resistive heating structure 504 (and hence also a second waveguide section 502) of a different length, although the widths of the resistive heating structure 504 (e.g. the one or more resistive heating pads, as described above) may be substantially the same. Thermal isolation trenches 506 are formed between each of the tunable elements 500 to reduce any heating from one resistive heating pad 504 spreading and causing changes in refractive index in an adjacent tunable element or an adjacent optical path. The second waveguide section 502 in the tunable element 500 may be a second waveguide section 302 as described above with reference to FIGS. 3A-3G or a second waveguide section 402 as described above with reference to FIGS. 4A-4G. Similarly, the resistive heating structure 504 in the tunable element 500 may be a resistive heating pad 304 as described above with reference to FIGS. 3A-3E or two resistive heating pads 304A, 304B, 404A, 404B as described above with reference to any of FIGS. 3F-3G and 4A-4E.

It will be appreciated that the diagrams in FIGS. 3A-3G, 4A-G and 5 do not necessarily show the entire structure or material stack and there may be additional layers or elements not shown in the diagrams (e.g. additional metal layers to provide tracks to electrically connect to the resistive heating pad(s)).

FIGS. 6A-6D show four different example methods of fabrication of an improved tunable element 300 as described herein. FIGS. 7A-7D show four different example methods of fabrication of an improved tunable element 400 as described herein. FIGS. 8A-8D show four different example methods of fabrication of an improved tunable element 320, 420 as described herein. Whilst these methods are described in isolation of the rest of the tunable waveguide device, it will be appreciated that in many examples the improved tunable element 300, 320, 400, 420 is fabricated at the same time as the rest of the tunable waveguide device.

In the example methods shown in FIGS. 6A-6D, 7A-7D and 8A-8D there are many stages in common and in all methods, the stages performed are substantially the same (with the omission, in some examples, of some cladding layers); however they may be performed in different orders in order to fabricate the different layer structures shown in FIGS. 3B-3D, 3G, 4B-4D and 4G. There may also be additional manufacturing stages which are not shown in FIGS. 6A-6D, 7A-7D and 8A-8D, such as deposition of additional metal layers, cleaning stages, etc.

FIG. 6A shows an example method of fabricating an improved tunable element having a cross-section as shown in FIG. 3B. A first cladding layer is formed (block 602) and this may be formed directly on a substrate (e.g. a silicon wafer) or on a part-processed substrate (e.g. such that the cladding is not formed directly on the surface of the substrate but on materials that have already been deposited on the substrate). In various examples, this first cladding layer may comprise a buried oxide layer. The second waveguide section 302 may then be formed from the second material on top of the first cladding layer (block 604) before a second cladding layer is deposited (block 606). The first and third waveguide sections 301, 303 may then be formed at the same time on top of the second cladding layer (block 608) before a third cladding layer is deposited (block 608). The resistive heating pad 304 is then deposited on top of the third cladding layer (block 612) and then covered by a fourth cladding layer (block 614).

FIG. 6B shows an example method of fabricating an improved tunable element having a cross-section as shown in FIG. 3C. This method is similar to that shown in FIG. 6A and described above (e.g. in that it forms a multi-layer waveguide structure); however, as shown in FIG. 6B, the first and third waveguide sections 301, 303 are formed at the same time on top of the first cladding layer (block 608) before the second cladding layer is deposited (block 606). The second waveguide section 302 is then formed on top of the second cladding layer (block 604) before a third cladding layer is deposited (block 608). As before, the resistive heating pad 304 is then deposited on top of the third cladding layer (block 612) and then covered by a fourth cladding layer (block 614).

FIGS. 6C and 6D show two different example methods of fabricating an improved tunable element having a cross-section as shown in FIG. 3D. The methods of FIGS. 6C and 6D are similar to those shown in FIGS. 6A and 6B; however, as the first, second and third waveguide sections 301-303 are substantially co-planar, there is one fewer cladding deposition step (i.e. block 614 is omitted) and the second waveguide section 302 may be formed (in block 604) either directly after (as in FIG. 6C) or directly before (as in FIG. 6D) the forming of the first and third waveguide sections 301, 303 (in block 608). In the method of FIG. 6C, a continuous waveguide core may be formed initially from the first material (in block 608) such that the first and third waveguide sections are connected and then (also in block 608), a portion of the waveguide formed from the first material may be removed to leave a gap where the second material can be deposited (in block 604) to form the second waveguide section.

The methods shown in FIGS. 7A-7D are very similar to those shown in FIGS. 6A-6D and described above. As shown in the diagrams, instead of forming the second waveguide section (in block 604) and the resistive heating pad (in block 612) in separate processing stages, the formation of the structures (the second waveguide section 402 and resistive heating pads 404A, 404B) is now linked. Initially, undoped regions, which will ultimately form the resistive heating pads, are formed at the same time as the second waveguide section (block 704) and then those regions are doped (block 705). The undoped regions that are formed from the second material at the same time as the second waveguide section (in block 704), have the dimensions of the resistive heating pads and the doping changes the thermal and electrical properties of the regions. Although not shown in FIGS. 7A-7D, it will be appreciated that the formation of the second waveguide section 402 (in block 704) may involve an etching process, or two separate deposition stages, in order to form the stepped cross-section as shown in FIG. 4E.

The methods shown in FIGS. 8A-8D are very similar to those shown in FIGS. 6A-6D and described above. As shown in the diagrams, instead of forming a single resistive pad on top of a cladding layer, the resistive pads are formed directly on the second waveguide section (in block 812). Although not shown in FIGS. 8A-8D, it will be appreciated that the formation of the second waveguide section 402 (in block 804) may involve an etching process, or two separate deposition stages, in order to form the stepped cross-section as shown in FIG. 4G.

Depending upon the materials used to form the cladding and waveguide sections, the techniques used to form them may be different. For example, where the second waveguide section is formed from crystalline silicon, this cannot be formed by deposition and hence the cladding layer below the second waveguide section (e.g. the first cladding section) may be a buried oxide (BOX) layer. Furthermore, because crystalline silicon cannot be formed by deposition, crystalline silicon cannot be used to form the second waveguide section in the variants of the improved tunable element shown in FIGS. 3C and 4C. If silicon is used to form the second waveguide section in these variants, then polycrystalline or amorphous silicon may be used.

A first further example provides a tunable element for an optical waveguide device, the tunable element comprising: a first waveguide section formed from a first material; a second waveguide section formed from a second material and arranged to receive light coupled from the first waveguide section; a third waveguide section formed from the first material and arranged to receive light coupled from the second waveguide section; and one or more resistive heating pads proximate to the second waveguide section, wherein the second material is more thermo-optically sensitive than the first material.

The first and third waveguide sections may be formed in a first layer and the second waveguide section may be formed in a second layer.

In use, light may be coupled vertically between an end of the first waveguide section and a proximate end of the second waveguide section and may be further coupled vertically between an opposite end of the second waveguide section and a proximate end of the third waveguide section.

The tunable element may further comprise a layer of cladding material between the first layer and the second layer.

The one or more resistive heating pads may be formed in a third layer. The tunable element may further comprise a layer of cladding material between the second layer and the third layer.

The tunable element may further comprise a layer of cladding between the first layer and the third layer, such that the second layer is further from the third layer than the first layer.

The one or more resistive heating pads may be formed in the second layer. The one or more resistive heating pads may be formed from a resistive region of the second material.

The second waveguide section may comprise a centre portion and two outer portions, wherein the centre portion is thicker than the outer portions.

The first, second and third waveguide sections may be formed in a single layer.

In use, light may be butt-coupled between an end of the first waveguide section and a proximate end of the second waveguide section and may be further butt-coupled between an opposite end of the second waveguide section and a proximate end of the third waveguide section.

The resistive heating pad may be formed in a second layer.

The tunable element may further comprise a layer of cladding material between the first layer and the second layer.

The second waveguide section may comprise a centre portion and two outer portions, wherein the centre portion is thicker than the outer portions and wherein the resistive heating pad may be formed on top of each of two outer portions of the second waveguide section.

The first material may be silicon nitride and the second material may be silicon, amorphous silicon or polycrystalline silicon.

Each resistive heating pad may have a length that is identical to a length of the second waveguide section, such that each resistive heating pad is proximate to the second waveguide section and not to the first or third waveguide sections.

A second further example provides a tunable optical waveguide device comprising one or more tunable elements of the first further example.

A third further example provides an optical phased array comprising one or more tunable elements of the first further example.

A fourth further example provides a method of fabricating a tunable element for an optical waveguide device, the method comprising: forming a first waveguide section and a third waveguide section from a first material; forming a second waveguide section from a second material; forming at least one layer of cladding material on the second waveguide section; and forming one or more resistive heating pads on top of a layer of cladding material and proximate to the second waveguide section, wherein the second material is more thermo-optically sensitive than the first material.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A tunable element (300, 320, 400, 420, 501) for an optical waveguide device, the tunable element comprising:
    a first waveguide section (301) formed from a first material;
    a second waveguide section (302, 402) formed from a second material and arranged to receive light coupled from the first waveguide section;
    a third waveguide section (303) formed from the first material and arranged to receive light coupled from the second waveguide section; and
    one or more resistive heating pads (304, 404A, 4048, 424A, 424B) proximate to the second waveguide section,
    wherein the second material is more thermo-optically sensitive than the first material,
    wherein the first waveguide section and the third waveguide section (301, 303) are formed in a first layer and are co-planar, and the second waveguide section (302, 402) is formed in a second layer;
    wherein the first waveguide section, the second waveguide section, and the third waveguide section are surrounded by cladding material (203);
    wherein the one or more resistive heating pads is covered by a layer of the cladding material (203); and
    wherein each resistive heating pad (304) has a length that is identical to a length of the second waveguide section (302).

2. The tunable element according to claim 1, wherein in use light is coupled vertically between an end of the first waveguide section and a proximate end of the second waveguide section and is further coupled vertically between an opposite end of the second waveguide section and a proximate end of the third waveguide section.

3. The tunable element according to claim 1, wherein a layer of cladding material is between the first layer and the second layer.

4. The tunable element according to claim 1, wherein the one or more resistive heating pads (304) are formed in a third layer.

5. The tunable element according to claim 4, wherein a layer of cladding material is between the second layer and the third layer.

6. The tunable element according to claim 4, wherein a layer of cladding is between the first layer and the third layer, such that the second layer is further from the third layer than the first layer.

7. The tunable element according to claim 1, wherein the one or more resistive heating pads (304A, 304B, 404A, 404B) are formed in the second layer.

8. The tunable element according to claim 7, wherein the one or more resistive heating pads (404A, 404B) are formed from a resistive region of the second material.

9. The tunable element according to claim 7, wherein the second waveguide section comprises a centre portion (402A) and two outer portions (402B, 402C), wherein the centre portion is thicker than the two outer portions.

10. The tunable element according to claim 1, wherein the first waveguide section, the second waveguide section, and the third waveguide section (301-303) are formed in a single layer.

11. The tunable element according to claim 10, wherein in use light is butt-coupled between an end of the first waveguide section and a proximate end of the second waveguide section and is further butt-coupled between an opposite end of the second waveguide section and a proximate end of the third waveguide section.

12. The tunable element according to claim 10, wherein the resistive heating pad is formed in the second layer.

13. The tunable element according to claim 12, wherein a layer of cladding material is between the first layer and the second layer.

14. The tunable element according to claim 1, wherein the second waveguide section comprises a centre portion (402A) and two outer portions (402B, 402C), wherein the centre portion is thicker than the two outer portions, and wherein the resistive heating pad is formed on top of each of the two outer portions of the second waveguide section.

15. The tunable element according to claim 1, wherein the first material is silicon nitride and the second material is silicon, amorphous silicon or polycrystalline silicon.

16. The tunable element according to claim 1, wherein each resistive heating pad is proximate to the second waveguide section and not to the first waveguide section or the third waveguide section (301, 303).

17. A tunable optical waveguide device comprising one or more tunable elements according to claim 1.

18. An optical phased array comprising one or more tunable elements according to claim 1.

19. A method of fabricating a tunable element for an optical waveguide device, the method comprising:
    forming a first waveguide section (301) and a third waveguide section (303) from a first material (608);
    forming a second waveguide section (302, 402) from a second material (604, 704);
    forming at least one layer of cladding material on the second waveguide section (606, 610); and
    forming one or more resistive heating pads on top of a layer of the cladding material and proximate to the second waveguide section (612, 704-705), wherein the second material is more thermo-optically sensitive than the first material and the first waveguide section and the third waveguide section (301, 303) are formed in a first layer and are co-planar, and the second waveguide section (302, 402) is formed in a second layer;

the first waveguide section, the second waveguide section, and the third waveguide section are surrounded by the cladding material (203); the one or more resistive heating pads is covered by the layer of the cladding material (203); and each resistive heating pad (304) has a length that is identical to a length of the second waveguide section (302).

\* \* \* \* \*

UNITED STATES PATENT AND TRADEMARK OFFICE
CERTIFICATE OF CORRECTION

PATENT NO. : 11,662,519 B2
APPLICATION NO. : 17/286004
DATED : May 30, 2023
INVENTOR(S) : Xianshu Luo and Guo-Qiang Lo It is certified that error appears in the above-identified patent and that said Letters Patent is hereby corrected as shown below:

In the Claims

In Column 15, Line 45, Claim 1, delete "4048" and insert --404B--.

Signed and Sealed this
Eleventh Day of July, 2023

Katherine Kelly Vidal
*Director of the United States Patent and Trademark Office*